United States Patent [19]

Kawai

[11] Patent Number: 5,136,199
[45] Date of Patent: Aug. 4, 1992

[54] DEVICE FOR DRIVING PIEZOELECTRIC VIBRATOR

[75] Inventor: Taneichi Kawai, Aichi, Japan

[73] Assignee: Aisin Seiki K.K., Aichi, Japan

[21] Appl. No.: 614,427

[22] Filed: Nov. 16, 1990

[30] Foreign Application Priority Data

Nov. 17, 1989 [JP] Japan .................. 1-300624

[51] Int. Cl.⁵ .................................. H01L 41/08
[52] U.S. Cl. .................................. 310/317; 310/316
[58] Field of Search ............ 310/314, 315, 316, 317;
318/116, 118

[56] References Cited

U.S. PATENT DOCUMENTS

| | | | |
|---|---|---|---|
| 3,432,691 | 3/1969 | Shoh | 310/316 |
| 3,989,042 | 11/1976 | Mitsui et al. | 310/316 X |
| 4,271,371 | 6/1981 | Furuchi et al. | 310/316 |
| 4,318,062 | 3/1982 | Mitsui | 310/317 X |
| 4,632,311 | 12/1986 | Nakane | 310/316 X |
| 4,689,515 | 8/1987 | Benndorf et al. | 310/316 |
| 4,748,365 | 5/1988 | Poupaert et al. | 310/316 |
| 4,879,528 | 11/1989 | Gotanda | 310/316 X |
| 5,025,187 | 6/1991 | Fujie et al. | 310/316 X |

Primary Examiner—Mark O. Budd
Attorney, Agent, or Firm—Sughrue, Mion, Zinn, Macpeak & Seas

[57] ABSTRACT

A device for driving a piezoelectric vibrator is comprised of an AC power supply for supplying electric power to a piezoelectric vibrator for vibration thereof, a detecting device for detecting current supplied to the piezoelectric vibrator, and a driving circuit interposed between the AC power supply and the piezoelectric vibrator so as to decrease the electric power being supplied to the piezoelectric vibrator as the current flowing therethrough increases. This structure brings a decrease in electric power being supplied to the piezoelectric vibrator when current flowing therethrough is increased during resonance of the piezoelectric vibrator, thereby enabling the restriction or regulation of the expansion and contraction of the piezoelectric vibrator while maintaining resonance thereof.

3 Claims, 4 Drawing Sheets

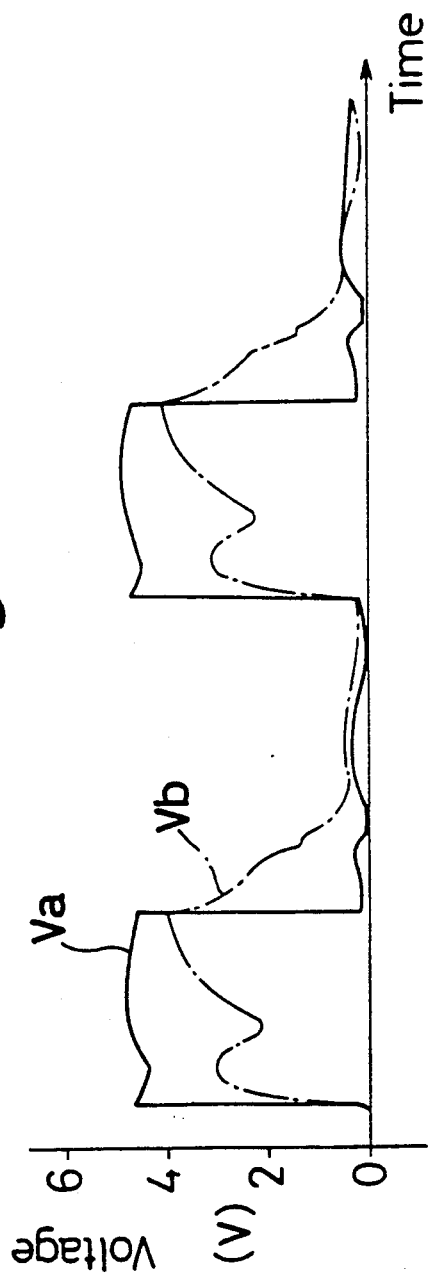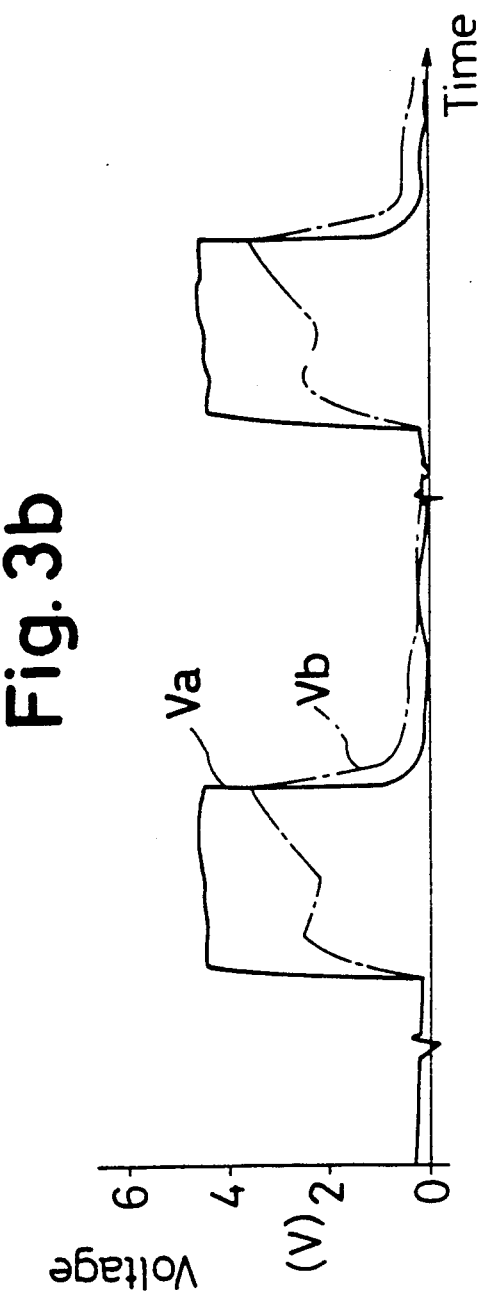

DEVICE FOR DRIVING PIEZOELECTRIC VIBRATOR

BACKGROUND OF THE INVENTION

The present invention relates to a device for driving a piezoelectric vibrator.

Conventionally, a piezoelectric vibrator is designed to be driven by a device including an AC power supply which is variable in frequency. This concept or structure is based on the fact that the resonance of a piezoelectric vibrator causes its effective vibration upon application thereto of a suitable frequency of an AC signal. Such structure has been shown in Japanese Patent Publication No. 50-26391 which was published after examination in 1975. In the device shown in this document, the output frequency of an AC power supply is adjusted so as to establish an in-phase relation between the current and the voltage of electric power supplied to a piezoelectric vibrator. Similar structure is also shown in Japanese Kokai 59-87078 published in 1984 without examination. A piezoelectric vibrator is used for vibrating a mirror in the form of a plate member to thereby remove water drops thereon as disclosed in Japanese Kokai 62-238149 published in 1987 without examination.

However, the foregoing piezoelectric vibrator is expanded and contracted repeatedly in such a manner that the vibrator is bent into a curvature having a considerable radius in opposed directions, thereby generating minute crazes in the vibrator in a short time. This leads to the degradation of the piezoelectric vibrator. In addition, if such a piezoelectric vibrator is secured to a mirror, excessive stress will be applied to the mirror, thereby generating cracks therein.

SUMMARY OF THE INVENTION

It is, therefore, a primary object of the present invention to provide a device for driving a piezoelectric vibrator without the aforementioned drawbacks.

To achieve the objects and in accordance with the purposes of the present invention, a device for driving a piezoelectric vibrator is comprised of an AC power supply for supplying electric power to a piezoelectric vibrator for causing vibration thereof, detecting means for detecting current supplied to the piezoelectric vibrator, and a driving circuit interposed between the AC power supply and the piezoelectric vibrator so as to decrease the electric power to be supplied to the piezoelectric vibrator as the current flowing therethrough increases.

The foregoing and other objects, features and advantages of the invention will be apparent from the following more particular description of a preferred embodiment of the invention a illustrated in the accompanying drawings.

BRIEF DESCRIPTION OF THE DRAWINGS

FIG. 3a is a graph showing wave forms of gate voltages of a transistor from which diodes are removed;

FIG. 3b is a graph showing wave forms of gate voltages of a transistor to which diodes are connected.

DETAILED DESCRIPTION OF THE INVENTION

Figure 1:
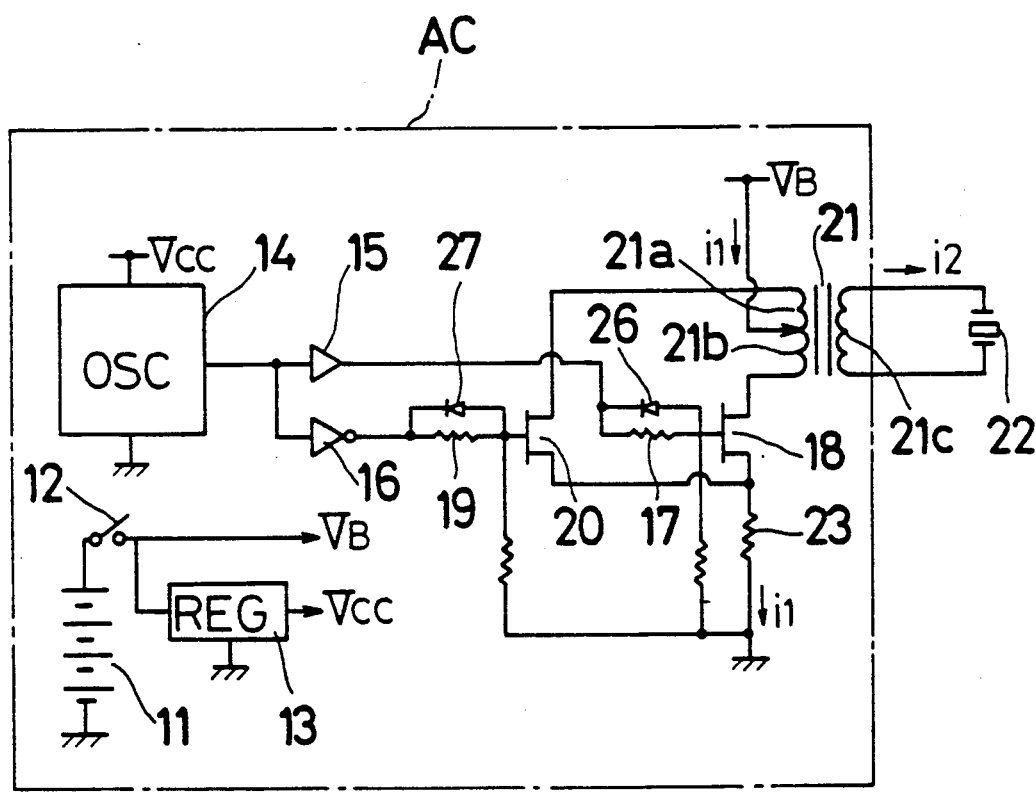
FIG. 1, is a block diagram of a device for driving a piezoelectric vibrator of one embodiment according to the present invention.

Referring now to FIG. 1 which shows a block diagram of a driving device AC according to one embodiment of the present invention, a battery 11 which constitutes a power supply is connected, via a switch 12, to a voltage regulator 13 which is designed to supply electric power to an oscillator circuit 14, a buffer circuit 15 and a inverting buffer circuit 16.

Upon closure of the switch 12, the oscillator circuit 14, which is constituted as an AC power supply, is brought into operation which is designed to be a sweep oscillator so that the range of oscillation frequency covers the resonance frequency of a vibration system including a piezoelectric vibrator 22. Since the sweep oscillator is well-known, its explanation is omitted.

The buffer circuit 15 is connected to the oscillator circuit 14 in order to amplify an output signal therefrom. The resulting signal is applied via resistor 17 to a gate terminal of a transistor 18 in the form of an N-channel field effect transistor.

Similarly, the inverting buffer circuit 16 is connected to the oscillator circuit 14 so as to amplify a output signal therefrom. The resulting signal is fed, via a resistor 19, to a gate terminal of a transistor 20 which is similar to the transistor 18. Since opposed signals in polarity are supplied to the transistors 18 and 20, while the transistor 18 is in the ON-condition (OFF-condition), the transistor 20 is kept in the OFF-condition (ON-condition).

Between the switch 12 from which a voltage of VB is derived and a drain terminal of the transistor 18 (20), there is interposed a primary winding 21b (21a) of a transformer 21. Due to alternative ON-conditions of transistors 18 and 20, the windings 21a and 21b are energized alternately, thereby producing electric power of about 600 V in a secondary winding 21c of the transformer 21. The transistors 18 and 20 constitute a driving circuit.

The voltage generated in the secondary winding 21c of the transformer 21 is applied to the piezoelectric vibrator 22, thereby causing a current i2 which is in proportion to the amount of expansion and contraction of the piezoelectric vibrator 22. At this time, a current i1 flows through the windings 21a and 21b which corresponds to the current i2. Thus, both currents i1 and i2 are increased if the degree of expansion and contraction of the piezoelectric vibrator 22 increases upon resonance.

Source terminals of the transistors 18 and 20 are grounded via a common resistor 23 which constitutes a detecting circuit. Since the entire current i1 flows through the resistor 23, a voltage is generated thereacross which is in proportion to the current i1.

The voltage generated across the resistor 23 reduces the potential difference between the source terminal and the gate terminal of each of the transistors 18 and 20. Thus, each of the transistors 18 and 20 operates to decrease the current i1 gradually as the current i1 increases. This results in the prevention of abrupt changes in the currents i1 and i2, thereby eliminating the generation of uncomfortable noise at the piezoelectric vibrator 22.

Figure 2A:
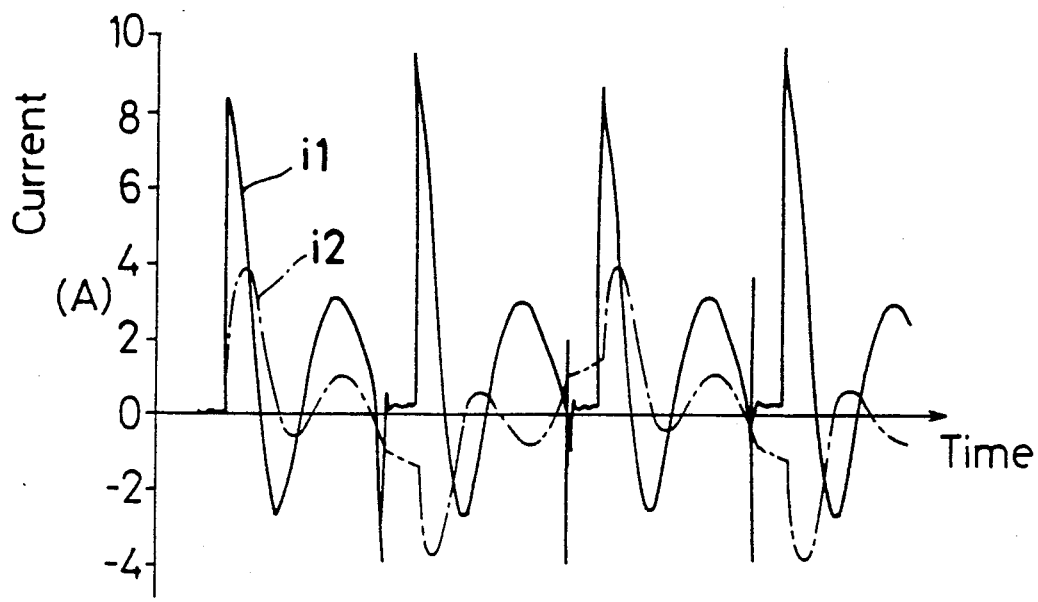
FIG. 2a is a graph showing wave forms of currents flowing through primary and secondary windings of a transformer where current regulation is established.

In FIG. 2a, there is shown wave forms of the currents i1 and i2 when the resistor 23 is short circuited. Under this condition, due to inactivity of both transistors 18 and 20, the peak value of the current i1 reaches a value of about 8 amperes, whereby the peak value of the current i2 becomes about 4 amperes in the secondary winding 21c.

Apart from the foregoing, due to the superposition of high frequency harmonics on the current i1, another peak value of about minus 2 amperes is generated subsequent to the generation of the peak value of about 8 amperes. Also, as to the current i2, another peak value of minus 1 ampere is generated immediately after generation of the peak value of 4 amperes.

Figure 2B:
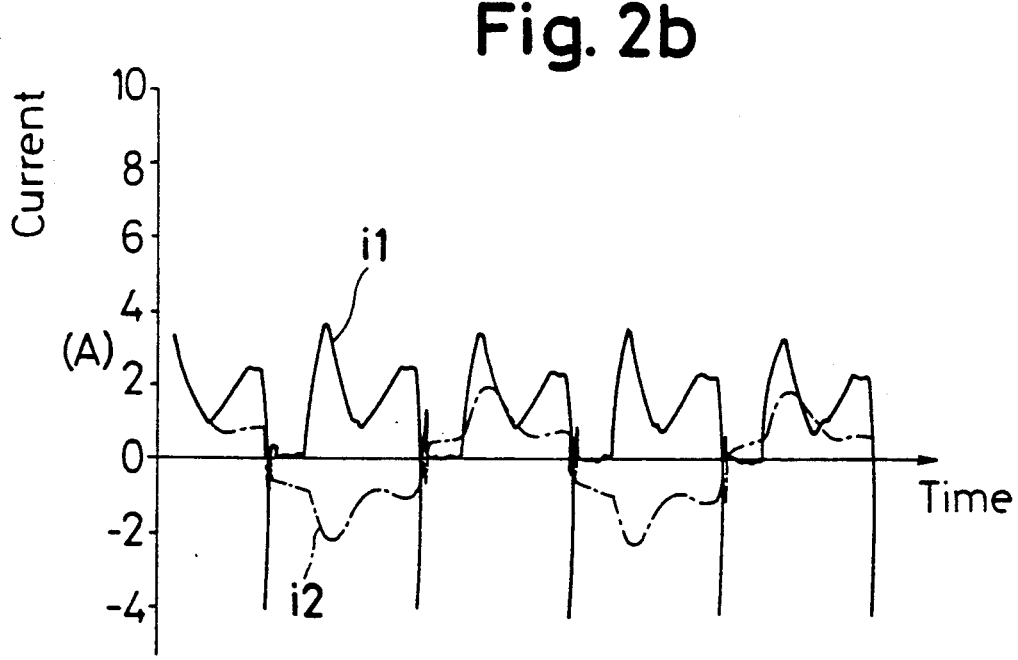
FIG. 2b is a graph showing wave forms of currents similar to those shown in FIG. 2a where current regulation is released.

FIG. 2b illustrates wave forms of the currents i1 and i2 under the condition where the short circuit of the resistor 23 is removed. As a result of operations of transistors 18 and 20 for regulating the current i1 to the windings 21a and 21b, the peak value of the current i1 is restricted to about 4 amperes. Thus, the current i2 flowing through the secondary winding 21c is also regulated to about 2 amperes. This decrement of the peak value of the current i2 brings a decrease of maximum stress applied to the piezoelectric vibrator 22, thereby improving the durability thereof.

Restriction of the peak value of the current i1 also results in a decrease of the high frequency harmonic superposition on the current i1. Thus, another peak value which is generated after the generation of the peak value of about 4 amperes, is lowered to about 1 ampere. Similarly, with respect to the current i2, another peak value is lowered to about 1 ampere after the generation of the peak value of about 2 amperes. Thus, the frequency of the expansion and contraction of the piezoelectric vibrator 22 can be reduced, thereby improving the durability thereof.

As mentioned above, in the device AC, the application of excess stress to the piezoelectric vibrator 22 can be prevented due to the fact that the peak value of the current i2 to be supplied thereto is restricted. Thus, the occurrence of minute crazings is rare, thereby preventing the degradation of the piezoelectric vibrator 22 in the long range.

It is noted that in this device AC diodes 24, 27 are connected in parallel to the resistors 17, 19 respectively. The diodes 26, 27 are designed to discharge quickly the charges stored in capacitance formed between the gate terminal and the source terminal of the transistors 18, 20 to thereby decrease the differential potential therebetween quickly.

FIG. 3a shows wave forms of the gate voltage of the transistor 18 under the condition where diodes 26 and 27 are removed. After an output voltage Va of the buffer circuit 15 drops, charges stored in the capacitance between the source terminal is discharged gradually by flowing through the resistor 17, thereby dropping gradually a voltage Vb of the gate terminal. During dropping of the voltage Vb, the transistor 18 goes on generating heat due to the consumption of electricity.

FIG. 3b is a graph for showing a wave form of the gate voltage of the transistor 18 under the condition that the diode 26 is connected. If the output voltage Va of the buffer circuit 15 drops, the diode 26 brings the resistor 17 into its short circuited condition, thereby discharging the charges stored between the gate terminal and the source terminal of the transistor 18 towards the buffer circuit 15 gradually. This results in quick drop of the voltage Vb of the gate terminal of the transistor 18.

Similarly, upon dropping of the output voltage of the inverting buffer circuit 16, the short circuit of the resistor 19 caused by the diode 2 brings the discharge of the charges between the gate terminal and source terminal of the transistor 19 quickly toward the buffer circuit 16. Thus, the voltage at the gate terminal of the transistor 19 is dropped quickly.

As mentioned above, as a result of the actuation of diodes 26 and 27, transistors 18 and 20 are brought into OFF-conditions quickly, thereby decreasing the heat generation thereat.

Figure 4A:
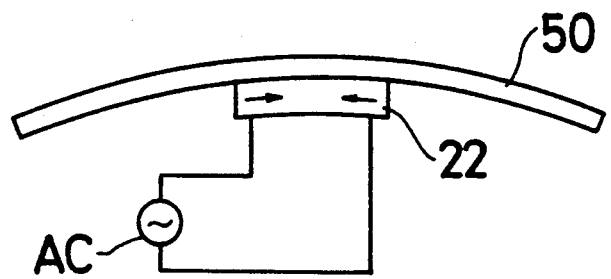
FIGS. 4a, 4b and 4c are illustrations for showing operations of a mirror to which a piezoelectric vibrator is secured.
Figure 4B:
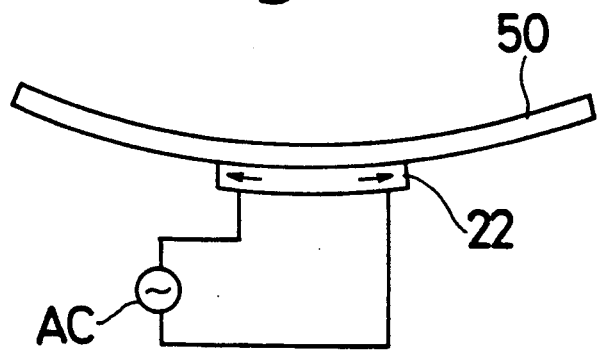
Figure 4C:
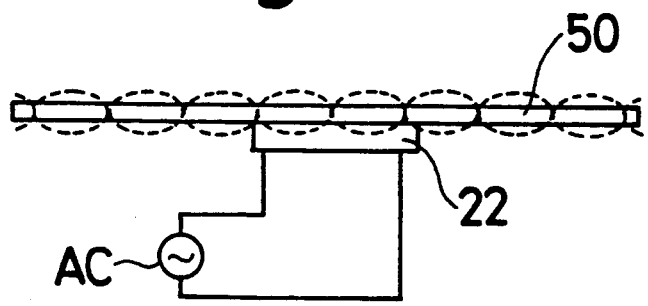

Hereinafter, an application or a practical use of the device will be described with reference to FIGS. 4a, 4b and 4c. The piezoelectric vibrator 22 can be adhered to a backside of a plate member 50 such as a mirror to be mounted on a vehicle body (not shown). When the piezoelectric vibrator 22 is driven by the device AC, as shown in FIGS. 4a and 4b, the mirror 50 is bent into a curvature in the opposed directions repeatedly due to the alternate applications of the expansion and contraction forces to the mirror 50. As a result of resonance of the mirror 50 which occurs when a suitable frequency is transmitted to the mirror 50 from the device AC, a stationary wave with large amplitude is generated evenly on the entire mirror 50 (FIG. 4c).

Due to the foregoing stationary wave, an outer surface 50a of the mirror 50 is brought into movement at a high speed. At this time, water drops on the surface 50a of the mirror 50 are removed therefrom by being dropped off o sprayed outwardly.

In the foregoing device AC, due to sweep oscillation of the oscillator 14 which covers a range of frequencies, the stationary wave can move along the surface 50a, thereby enabling a uniform removal of water drops.

In the device A , excess application of current to the piezoelectric vibrator 22 can be prevented by the actuation of transistors 18 and 20. This enables the prevention of excess bending action in the opposite directions of the piezoelectric vibrator 22 despite resonances of the mirror 50 and the piezoelectric vibrator 2. Thus, excess stress is not applied to a bonding portion by which the mirror 50 and the piezoelectric vibrator 22 are adhered to each other, thereby preventing separation of the mirror 50 and the piezoelectric vibrato 22. Further, the mirror 50 rarely cracks without application of excess stress thereto.

In summary, the device AC for driving the piezoelectric vibrator 22 is designed to reduce the electric power to be supplied to the piezoelectric vibrator 22 when the current flowing therethrough is increased during the resonance of the piezoelectric vibrator 22. According to this structure or construction, the expansion and contraction of the piezoelectric vibrator 22 can be restricted while maintaining the resonance thereof. This restriction results in the decrease of stress applied to the mirror 50 form the piezoelectric vibrator 22.

While the invention has been particularly shown and described with reference to preferred embodiments thereof, it will be understood by those in the art that the foregoing and other changes in form and details may be made therein without departing from the spirit and scope of the invention.

What is claimed is:

1. A device for driving a piezoelectric vibrator comprising:

transformer means connected to said piezoelectric vibrator;

power supply means for supplying electric power to the piezoelectric vibrator for vibration thereof; and driving circuit means interposed and connected between said power supply means and said transformer means to control current supplied to said piezoelectric vibrator;

said driving circuit means including first and second transistors connected to said power supply means and said transformer means for controlling current to said transformer means, first and second circuit means connected to said first and second transistors, respectively to control the discharge of said transistors in said driving circuit, and detecting means comprising a resistor connected in said driving circuit means for detecting current supplied to the piezoelectric vibrator;

whereby said driving circuit means control the magnitude of current supplied to said transformer means and therefore current supplied to said piezoelectric vibrator in accordance with the voltage detected by said detecting means.

2. A device as set forth in claim 1, wherein said piezoelectric vibrator is adhered to a plate member.

3. A device as set forth in claim 2, wherein said plate member is a mirror.

* * * * *